United States Patent
Barth (10) Patent No.: US 7,376,254 B2
(45) Date of Patent: May 20, 2008

(54) METHOD FOR SURFACE-CONTOURING OF A THREE-DIMENSIONAL IMAGE

(75) Inventor: Karl Barth, Hoechstadt (DE)

(73) Assignee: Siemens Aktiengesellschaft, Munich (DE)

( * ) Notice: Subject to any disclaimer, the term of this patent is extended or adjusted under 35 U.S.C. 154(b) by 712 days.

(21) Appl. No.: 10/721,564

(22) Filed: Nov. 25, 2003

(65) Prior Publication Data

US 2004/0160440 A1    Aug. 19, 2004

(30) Foreign Application Priority Data

Nov. 25, 2002  (DE)  ................. 102 54 907

(51) Int. Cl.
*G06K 9/00* (2006.01)

(52) U.S. Cl. .................. 382/131; 382/154; 378/21

(58) Field of Classification Search ................ 382/128, 382/129, 130, 131, 132, 133, 154, 177, 201, 382/203, 224, 254, 260, 275, 276, 168, 189, 382/285, 305; 600/443, 424; 128/898; 250/505.1; 378/21
See application file for complete search history.

(56) References Cited

U.S. PATENT DOCUMENTS

| | | | |
|---|---|---|---|
| 5,454,371 A * | 10/1995 | Fenster et al. | ............... 600/443 |
| 5,732,203 A | 3/1998 | Menegazzi | |
| 5,871,018 A * | 2/1999 | Delp et al. | ................... 128/898 |
| 6,522,777 B1 * | 2/2003 | Paulsen et al. | ............. 382/154 |
| 7,141,812 B2 * | 11/2006 | Appleby et al. | ......... 250/505.1 |
| 7,174,202 B2 * | 2/2007 | Bladen et al. | ............... 600/424 |

FOREIGN PATENT DOCUMENTS

| | | |
|---|---|---|
| DE | 199 51 502 | 1/2001 |
| WO | WO 93/09512 | 5/1993 |
| WO | WO 02/065401 | 8/2002 |
| WO | WO 02/093494 | 11/2002 |
| WO | WO02/093494 A2 * | 11/2002 |

OTHER PUBLICATIONS

Medizinische Bildverarbeitung, Christoph Pöppe: Datenakquisition, Segmentierung und Echtzeitverarbeitung; Spektrum der Wissenschaft Dossier: Perspektiven in der Medizintechnik, Jan. 2001.
Dynamic Programming and Stochastic Control Processes, R. Bellman, The Rand Corporation, Santa Monica, California; Information and Control 1,228-239 (1958).

(Continued)

*Primary Examiner*—Azarian Seyed
(74) *Attorney, Agent, or Firm*—Schiff Hardin LLP (57) ABSTRACT

In a method for surface contouring of a three-dimensional image of an object a set of planes is placed through the three-dimensional image, and the contours that are imaged in each of the planes of the first set of planes, and that are associated with the surface contour of the three-dimensional image, are determined. The contours are subsequently combined into a surface grid associated with the surface contour of the three-dimensional image.

11 Claims, 3 Drawing Sheets

OTHER PUBLICATIONS

A New Pruning/Merging Algorithm for MHT Multitarget Tracking, K. Buckley, A. Vaddiraju, R. Perry; Department of Electrical and Computer Engineering Villanova University, Villanova, PA 19085, May 2000.

Irrfahrten in Graphen, P. Tittmann Hochsule Mittweida, 8.März 2001, Aug. 2001.

VisionSystems Design Imaging and Vision Technologies for Engineers and Integrators, Sep. 2001.

Trellis Structure Approach to Multitarget Tracking R. Perry, A. Vaddiraju, K. Buckley Department of Electrical and Computer Engineering Villanova University Villanova, PA 19085, May 1999. INSPECT—eine Sonderpublikation von Messtec & Automation; Bilverarbeitung für die Kunststofftechnik, GIT Verlag, 64220 Darmstadt, 2002.

A Multiple Active Contour Model for Cardiac Boundary Detection on Echocardiographic Sequences, V. Chalana, D.T. Linker, Member, IEEE, D.R. Haynor and Y. Kim, Jun. 1996.

T-snakes: Topology adaptive snakes; T. McInerney, D. Terzopoulos, Department of computer Science, University of Toronto, Toronto Ont. Canada M5S 3H5, Oct. 1999.

Detecting the brain surface in sparse MRI using boundary models, P. Marias, J. M. Brady, Received Mar. 25, 1999: received in form Dec. 1, 1999: accepted Jan. 31, 2000.

Segmentiereung von Schnittbildern v. Udo Jendrysiak Spektrum der Wissenschaft Dossier: Perspektiven in der Medizintechnik, Jun. 1997.

* cited by examiner

FIG 5

METHOD FOR SURFACE-CONTOURING OF A THREE-DIMENSIONAL IMAGE

BACKGROUND OF THE INVENTION

1. Field of the Invention

The present invention concerns a method for surface contouring of a three-dimensional image of a subject.

2. Description of the Prior Art

For various applications (for example photographic analysis, industrial image processing, monitoring, traffic systems, media technology and animation), image processing and object recognition of two-dimensional, and to a certain extent three-dimensional, images of objects have progressed relatively far. The image data sets forming the images generally are relatively undisturbed and are acquired, for example, with optical sensors (see, for example, Inspect. MessTecAutomation, special publication 10/01, GIT Publishing Darmstadt, 2001, or Vision Systems Design, Vol. 6 #9, Pennwell, September 2001).

If the image data sets are relatively undisturbed, the surface contours of the images of the objects can be relatively simply determined by means of known methods. With linear or nonlinear filtering, noise in the image data sets can be further reduced. In order to recognize textures of the images, pattern matching can be implemented. Object borders can be determined, for example, by 2D- or 3D gradient calculation. Techniques based on gradient calculation are, for example, "active contours", specified in Chalana V., Linker D., "A Multiple Active Contour Model for Cardiac Boundary Detection on Echocardiographic Sequences", IEEE Trans. Med. Imaging 15, #3, June 1996, or so-called as "snakes", specified in McInerney T, Terzopoulos D: "T-snakes: Topology Adaptive Snakes", Medical Image Analysis 4, pages 73-91, 2000. Imaged objects of the same brightness, color or texture can, on the other hand, be "filled out", for example by a technique known as region growing, and thus be completely described for a specific task (see Jendrysiak U., "Segmentierung von Schnittbildern". Spektrum der Wissenschaft, Dossier January 1999: Perspektiven in der Medizintechnik 24-29, 1999).

In medical technology, however, it may be the case that imaged healthy and diseased tissue exhibit a relatively small contrast difference, and image data sets are very noisy. This is true in particular for x-ray images (computed tomography, angiography, fluoroscopy), images produced with a magnetic resonance device or in nuclear medicine, and particularly for images based on ultrasound (compare Marais P., Brady J., "Detecting the Brain Surface in Sparse MRI Using Boundary Models", Medical Image Analysis 4, 283-302, 2000, Chalana V., Linker D., "A Multiple Active Contour Model for Cardiac Boundary Detection on Echocardiographic Sequences", IEEE Trans. Med. Imaging 15, #3, June 1996, or Sakas G., "Dreidimensionale Bildrekonstruktion aus Ultraschall-Daten", Spektrum der Wissenschaft, Dossier January 1999: Perspektiven in der Medizintechnik 18-24, 1999).

Particularly when searching for a diagnosis for a patient, fine object differences must be differentiated in the overall depth of the body or of the organs of the patient. Since the image data sets acquired with medical devices often are very noisy, and acquired structures can be relatively complex, a determination of a contour in a two-dimensional image is already relatively computation-intensive. The determination of a contour of a three-dimensional image of an object is even more difficult. Known methods therefore have been refined, and often adapted ad hoc to the present problem. An example is specified in Chalana V., Linker D., "A Multiple Active Contour Model for Cardiac Boundary Detection on Echocardiographic Sequences", IEEE Trans. Med. Imaging 15, #3, June 1996. Another relatively computation-intensive method is specified in Jendrysiak U., "Segmentierung von Schnittbildern". Spektrum der Wissenschaft, Dossier January 1999: Perspektiven in der Medizintechnik 24-29, 1999.

SUMMARY OF THE INVENTION

It is an object of the invention to provide a method with which a surface contouring of a three-dimensional image of an object can be implemented with less calculation effort.

This object is achieved in accordance with the invention by a method for surface contouring of a three-dimensional image of a subject including the steps of placing a first set of planes through the three-dimensional image, determining the contours that are imaged in each of the planes of the first set of planes and are associated with the surface contour of the three-dimensional image, and composing the contours determined in each plane of the first set of planes into a surface grid associated with the surface contour of the three-dimensional image.

In accordance with the invention the surface of a three-dimensional image of a subject is to be contoured or segmented. The three-dimensional image is stored in a volume data set, thus a data set is formed of a 3D block $B(x,y,x)$ with $K \times L \times M$ voxels (volume elements). The three-dimensional image, alternatively can be stored in the form of a data set that contains K slices of images with $L \times M$ pixels (picture elements) per image.

For this, the planes of the first set of planes are placed through the three-dimensional image. The contour (that is associated with the surface contour of the three-dimensional image) is subsequently determined for each one of these planes. The determination of the contour associated with the individual planes corresponds to the determination of contours of two-dimensional images. After this, the individual contours are merged composed into a surface grid associated with the surface contour of the three-dimensional image.

In a preferred embodiment of the invention, the planes of the first set of planes intersect in a first straight line that, according to a particularly advantageous variant of the invention, proceeds substantially through the geometric center (center of mass) of the three-dimensional image. This is particularly advantageous for a convex three-dimensional image.

If, for example, the volume data set forming the three-dimensional image exhibits a relatively weak contrast, the volume data set can thus undergo a filtering, in particular for an automatic localization of the three-dimensional object (according to a variant of the invention) for the determination of the geometric center of the three-dimensional image. The filtering in particular can be a median filtering, and the geometric center in particular can be automatically determined. The volume data set thus is significantly smoothed while preserving edges. Via such a significant smoothing, the detailing of the boundaries may be partly lost, however the geometric center of the three-dimensional image can be precisely determined.

If the subject to imaged is a part of a living organism, and the three-dimensional image is acquired by means of a medical technology device, the geometric center of the three-dimensional image may be determined during a navigation-guided treatment of the living organism, according to a further embodiment of the invention. The geometric center can be determined, for example, during the navigation-guided treatment by the position of the focus of a navigated medical instrument.

A medical device suitable for the navigation is, among other things, specified in German OS 199 51 502. For example, a volume data set of the region of interest of the body of a patient is generated with an x-ray device. In particular during a minimally invasive procedure, for example, a surgeon inserts the medical instrument into the body of the patient. A position sensor of the navigation system is arranged at the medical instrument, such that the navigation system determines the position (meaning the location and orientation of the medical instrument) relative to the body of the patient. Based on the position determination, thus based on a determination of the spatial coordinates of the medical instrument, an image of the medical instrument can be folded into the image associated with the volume data set (that is, for example, shown on a monitor).

An automatic recognition of the approximate position of the medical instrument also is suitable with in nuclear medicine images. A volume data set acquired by PET exhibits a relatively good contrast, however it has a relatively poor resolution. An alternative is to manually designate the geometric center with a mouse click in another representation, for example in an x-ray image produced using contrast means in two projections, or in a CT-MPR multi-planar reformatting representation. This is nothing more than the reassembly of the volume data set in another orientation that, for example, originally horizontal slices are re-oriented (orthogonal MPRs: horizontal, sagittal, coronal; free MPR: arbitrary slanted secondary slices). This works isotropically with new multi-slice spiral CT or MR devices, for example from 512 CT slices with $512^2$ pixels per slice). The background for this is that various views of the image of the subject and its surroundings are shown coupled in a defined position and orientation. If the three-dimensional view is shifted and/or rotated, the associated MPR representation oriented thereto moves with it. The three-dimensional shifting and rotation are continued until the image of interest is centrally intersected by the MPR slice. Then the middle of this planar representation of the image is clicked; the subject center is thus defined in three dimensions.

By means of the inventive method, the dimensionality of the volume processing (3D image processing) is reduced by at least one stage. The curve of a 3D object density D of the three-dimensional image along a coordinate axis x of 3D space can be graphically represented as a two-dimensional function $D1(x)$. The three-dimensional image in space therefore can be correspondingly described with a function $D3(x,y,z)$ whose values (characteristic variables) are plotted in the fourth dimension. Thus the space spanned by x, y and z can be projected such that only the problem similar to the "one-dimensional random walk" (see Tittmann P., "Irrfahrten in Graphen", Memo Hochschule Mittweida, September 1998) or, respectively, an optimization along an abscissa x' alone (instead of (x, y, z)) is to be solved.

In order to achieve this, the planes of the first set of planes are placed through the three-dimensional image. In the general case, the planes of the first set of planes should at least redundantly, and completely, cover all voxels of the three-dimensional image in various orientations. The planes of the first set of planes preferably intersect in the first straight line that, at least substantially, proceeds through the geometric center of the three-dimensional image. With regard to a fixed normal axis, the individual planes of the first set of planes can exhibit, for example, equidistant angles $\alpha_1$ through $\alpha_m$, when the first set of planes comprises m planes. By the transition to a rotational geometry, redundancies arise in the direction of the rotation axis, and sparser sampling results in the opposite direction. However, scanning primarily needs to be observed in the region of the expected surface contour. By the "new acquisition" (re-sampling) of the three-dimensional image in planes rotating with respect to one another that intersect the three-dimensional image, a first stage of a dimension reduction is achieved, since the data sets associated with the planes are two-dimensional data sets and, for example, are described with Cartesian coordinates. If the volume data set is described with Cartesian coordinates (x,y,z), each data set associated with the planes of the first set of planes thus can be described with two-dimensional Cartesian coordinates $(x_j'',y_j'')$, whereby j=1 ... m, when the first set of planes contains m planes. Subsequently, the data sets associated with the individual planes of the first set of planes are analyzed in order to determine contours that are imaged in each of the planes of the first set of planes and are associated with the surface contour of the three-dimensional image.

In each of these planes $(x_j'',y_j'')$, a closed contour is expected. The contour $K_j''$ of the j-th plane of the first set of planes has the points $K_{ji}''=(x_{j,i}'',y_{j,i}'')$, with i=1 ... n. In order to determined each $K_{ji}''$, a two-dimensional search is required in $(x_{j,i}'',y_{j,i}'')$ that is known in general to those skilled in the art.

In order to reduce the calculation effort, however, in an embodiment of the invention, when the image contents of each plane of the first set of planes are specified with Cartesian coordinates, the following steps are implemented for each plane for the determination of the contours of each individual planes. A coordinate transformation to polar coordinates is implemented with regard to the geometric center of the three-dimensional image, and therewith unwinding of the contour, and the contour is determined in the transformed plane.

The contour in the transformed plane is thereby determined according to a preferred variant of the invention, in which a contour continuation is calculated in the direction of the angular coordinate ($\Phi$) with an optimization according to minimal changes.

Thus a transformation according to polar coordinates is applied with regard to the geometric center and the first straight line. Thus a "contour field" $K'(x',\Phi)$ with fixed $\Phi$ results, that covers 360°. The radial x' is designated as r (r=x') in the following, corresponding to the polar coordinates. With relatively little effort, only the one-dimensional problem remains, to determine the radius r at each angle $\Phi$ as a single quantity. The fact that this is actually a rather "one-dimensional" problem can be illustrated by plotting this function on a Cartesian system, for example with $\Phi$ in the abscissa and r in the ordinate. Some boundary conditions now result for r that can be utilized in order to find a qualitatively good contour:

The contour must have the same r-coordinate for $\Phi_1$ and $\Phi_n$ (closed contour).

The contour is continuous and has a predominantly vertical gradient. The r-offset from line to line is relatively small.

A typical "edge profile" in the brightness profile can be found by line comparison.

Possible compensation of signal noise in the line comparison.

For the transformation according to polar coordinates, the angular increment should preferably be selected such that adjacent points ($\Phi_i$, r) and ($\Phi_i+1$, r) in the region of the contour have approximately the distance of a voxel edge length. In place of the transformation to polar coordinates, a transformation with regard to a "model contour" can also be implemented when a similarity to such a model is to be expected. The abscissa is then characterized by the continuous indices $i_1$ through $i_n$ of the contour points of the model; the perpendicular distances to the model contour are plotted on the ordinate. Here a resampling also is used, as in the transformation to polar coordinates.

In the matrix resulting from the resampling, various features for an object edge can now be determined or accentuated by suitable signal processing, as well as being brought into context. For example, a search method can be applied that analyzes and combines all reasonable path branchings. An example of a realization is the dynamic optimization according to R. Bellman, "Dynamic programming and stochastic control processes", Information and Control, 1(3), pages 228-239, September 1958. The result is a continuous contour, for example in the polar coordinate representation of $\Phi_1$ through $\Phi_n$ (or, respectively, for $i_1$ through $i_n$). This contour can be transformed back to the original Cartesian coordinates. The dynamic optimization can combine a number of feature values (filter responses) into a suitable cost function, and, after the forward accumulation of costs, includes a backtracking as a substantial element. A plane of the first set of planes is thereby contoured.

The remaining planes of the first set of planes are correspondingly analyzed. Already-determined contours of previously analyzed planes can be used in order to also ensure the consistency of the three-dimensional surface contour of the three-dimensional image in the rotation direction described by $\alpha$ (usable prior knowledge). Likewise, all planes of the first set of planes can be analyzed independently. With one or more successive processing stages with which the individual contours of the planes of the first set of planes are compared, the obtained surface grid can be refined.

At the end of the processing of all planes of the first set of planes, the surface contour of the three-dimensional image initially exists in coordinates ($r$, $\alpha$, $\Phi$). In this artificial "cuboid", a processing of the 3D connectivity (correlation, interrelation) is possible, for example as a filtering of the r-values with a 2D operator.

The transformation back to the original Cartesian coordinates yields the surface grid of the three-dimensional image. The surface grid is comparable to a net-like cage. The surface grid now can be improved and refined in the original coordinates. The voxels within the surface grid can subsequently be marked as belonging to the three-dimensional object image.

The inventive method in the context of a spherical geometry has the advantage that it possesses no preferred direction and that, considered statistically, surface forms that occur in practice are handled better on average than in a method that is based on a Cartesian grid, since such a surface lies more parallel to a closed 3D contour. Because the inventive method is, geometrically, relatively well-adapted to the problem, the number of the planes of the first set of planes can be smaller by a multiple than when, in the region of the surface, the surface would be sampled in the voxel distance; this means the "net lines" can have a separation of, for example, ten or more voxel widths from one another while still describing the overall contour with sufficient precision.

In particular for an improved determination of the surface contouring of the three-dimensional image, or when unfavorable output (source) data are present, according to an embodiment of the invention the following additional steps are implemented.

A second set of planes is placed through the three-dimensional image, with the planes of the second set of planes intersecting in a second straight line. The contours that are imaged in the second set of planes are determined in each of these planes and are associated with the surface contour of the three-dimensional image. Together with the contours determined for the first set of planes, the contours determined in each plane of the second set of planes are combined into the surface grid associated with the surface contour of the three-dimensional image.

By re-extraction oriented on net lines (scan lines proceeding at right angles to one another, with orientation from the inside out) determined by means of the planes of the first set of planes and associated with the surface grid, the contouring also works with less convex, irregular three-dimensional images.

A benefit as to reliability and precision can be achieved when, according to an embodiment of the invention, the first straight line is aligned at a right angle to the second straight line, and in particular the first straight line and the second straight line intersect in the geometric center of the three-dimensional image.

The precise surface contouring can be used, for example, to determine the three-dimensional image precisely for a functional evaluation. For therapeutic or surgical procedures, the precise shape in relation to the vicinity (for example vessels), and also the shape change in the course of time, is very important. Further applications are possible in plastic surgery or in prosthetics, for the recognition of the object to be replaced or the recognition of cavities for an implant.

A simplified calculation of the necessary calculation operations illustrates some of the basic advantages of the inventive method. It is assumed that the volume data set exists in the form of 50 computed tomography slices of the matrix 512×512. The three-dimensional image is formed by a sub-cuboid of 40×200×200 voxels.

Given a surface contouring of the three-dimensional image according to the prior art, starting from a start point its continuation on the surface is sought. The surface of the entire sub-cuboid is 112000 pixels. For the gradient formation, a factor of 11 is applied with regard to the surface (kernel size $3^3 \Longrightarrow$ "26"), and applied with a factor of "1" for the 27 covered voxels. This effectively corresponds to five surface search-stripes inside and outside the surface. Starting from each point, in principle 17 directions in a preferred direction and laterally are examined initially the number of which then decreases. In a more sensible manner, the search is empirically delimited as specified, for example, in Buckley K., Vaddiraju A., Perry R., "A New Pruning/Merging Algorithm for MHT Multitarget Tracking", Radar-200, May 2000. Furthermore, it is assumed that it is sufficient to on average examine six alternatives with an average depth of three in order to differentiate a reasonable continuation from a wrong way or, respectively, to land on an already-classified point (multiplier $6^3$=216).

Given a surface contouring according to the already specified method, and not under consideration of "backtrackings", approximately 11×112000×26=33264000 gradient calculations are required, and approximately 216×112000=24192000 operations for the search for maximum gradient sum. Thus approximately 57000000 calculation operations result.

For the approximate calculation of necessary calculation operations for the surface contouring of the same three-dimensional image according to the inventive method, it is assumed that the first set of planes comprises 20 planes. After the transformation into polar coordinates, the image information of the transformed planes are respectively sampled in a 2° raster, whereby the corresponding CT images are reconstructed in the typical raster 512×512:180× 256=46000. The gradient formation and contour search are first carried out in the planes. Moreover, a noise-suppressing convolution is implemented with a kernel size of seven. A typical density profile in the region of the object edge is generated with seven supporting locations and shifted over the entire radius. In each shifting position, the covariance is calculated. In the search of the contours, a "jump" by one pixel from line to line is allowed; there are thus three alternatives. For post-processing of the connection between the planes, a 3×3 kernel is used. It thus results in approximately 20×46000=920000 operations for the gradient formation, and approximately 3×46000=138000 calculation operations for the search for a maximum gradient sum. Approximately 20×180×9=32400 calculation operations result for the backtracking, which here corresponds to a testing for the plane-to-plane connection. Thus approximately 1090400 calculation operations result.

Based on the inventive method with the specified assumptions, a reduction of the effort in calculation operations results by approximately the factor of 50.

DESCRIPTION OF THE PREFERRED EMBODIMENTS

Figure 1:
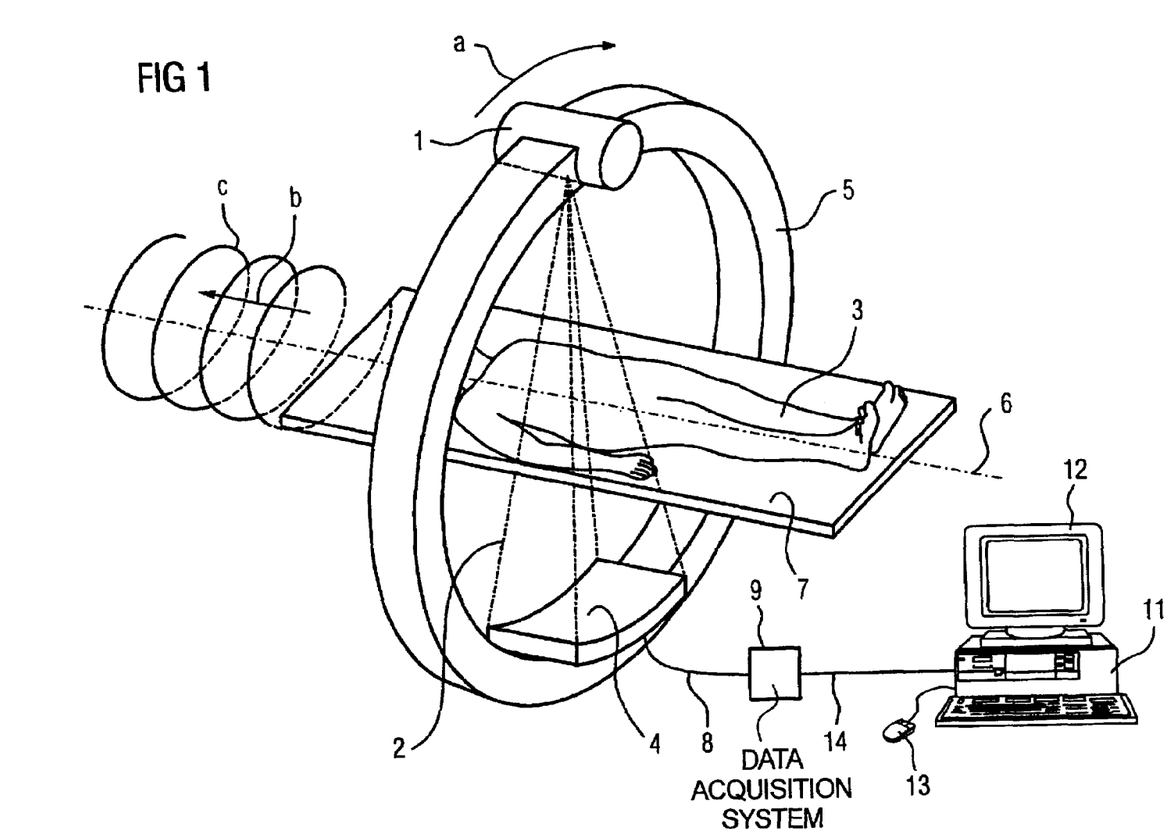
FIG. 1 shows a computed tomography apparatus operable in accordance with the invention.

FIG. 1 schematically shows a computed tomography apparatus with an x-ray source, from which is emitted a pyramid-shaped x-ray radiation beam 2 (the edge rays of which are shown as dash-dot lines in FIG. 1) that proceeds through an examination subject (for example a patient 3) and strikes a radiation detector 4. In the exemplary embodiment, the x-ray source 1 and the radiation detector 4 are arranged opposite one another on a gantry 5. With regard to a system axis 6 that runs through the middle point of the annular gantry 5, the gantry 5 can be rotated on a mounting device (not shown in FIG. 1) (arrow a).

In the exemplary embodiment, the patient 3 lies on a table 7, transparent to x-ray radiation, which is movably positioned along the system axis 6 by means of a carrier device (likewise not shown in FIG. 1) (arrow b).

The x-ray source 1 and the radiation detector 4 thus form a measurement system that, with regard to the system axis 6, is rotatable and movable along the system axis 6 relative to the patient 3, such that the patient 3 can be irradiated at various projection angles and various positions with regard to the system axis 6. From the ensuing output signals of the radiation detector 4, a data acquisition system 9 thus forms measurement values that are supplied to a computer 11 that calculates, by means of method known to those skilled in the art, an image of the patient 3 that can be reproduced on a monitor 12 connected with the computer 11. In the exemplary embodiment, the data acquisition system 9 is connected with an electrical line 8 that has, for example, (in a manner not shown) a slip or wiper ring system, or a wireless transmission link, with the radiation detector 4, and with an electrical line 14 with the computer 11.

The computed tomography apparatus device shown in FIG. 1 can be used both for sequential scanning and for spiral scanning.

In sequential scanning, a slice-by-slice scanning of the patient 3 ensues. The x-ray radiation source 1 and the radiation detector 4 are thereby rotated around the patient 3 with regard to the system axis 6, and the measurement system comprising the x-ray source 1 and the radiation detector 4 acquires a plurality of projections in order to scan a two-dimensional slice of the patient 3. A sectional image representing the scanned slice is reconstructed from the thereby-acquired measurement values. The patient 3 is moved along the system axis 6 between the scanning of successive slices. This event repeats until all slices of interest are acquired.

During spiral scanning, the measurement system formed by the x-ray source 1 and the radiation detector 4 rotates with regard to the system axis 6, and the table 7 continually moves in the direction of the arrow b, meaning the measurement system formed by the x-ray system 1 and the radiation detector 4 continually moves relative to the patient 3 on a spiral track c until the region of interest of the patient 3 is completely acquired. A volume data set is thereby generated that, in the case of the present exemplary embodiment, is coded according to the DICOM standard typical in medical technology.

Figure 2:
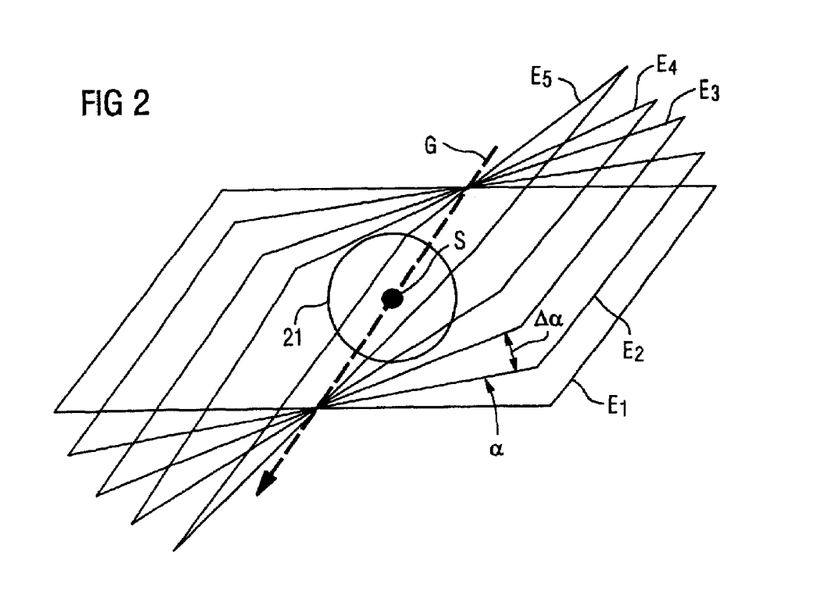
FIG. 2 shows a set of planes whose planes intersect with a three-dimensional image acquired with the computed tomography apparatus shown in FIG. 1.

In the exemplary embodiment, the surface of a three-dimensional image of a object (acquired with the volume data set) to be contoured is part of the region of interest of the patient 3. In this case, the object is a tissue variation of the patient 3. The three-dimensional image 21 is schematically shown in FIG. 2 and can be viewed with the monitor 12.

In order to contour the three-dimensional image 21, a first set of planes that (in the exemplary embodiment) contains 20 planes $E_1$ through $E_{20}$ is placed through the three-dimensional image 21. For clarity, in FIG. 2 only the planes E1 through E5 are shown. The planes E1 through E20 intersect in a first straight line G that, in the exemplary embodiment, proceeds through the geometric center S of the three-dimensional image 21. The geometric center is either manually, approximately marked in the three-dimensional image 21 by an operator (not shown in FIG. 1) by means of a mark (not shown in FIG. 2) that can be faded into the field of view of the monitor 12 and that can be moved with a computer mouse 13 connected with the computer 11, or the computer 11 is (in the exemplary embodiment) configured such that it automatically determines the approximate geometric center S of the three-dimensional image 21, and subsequently automatically determines the planes $E_1$ through $E_{20}$. Moreover, the operator in the exemplary embodiment can subject the volume data set to, for example, a median filtering with the computer 11. The volume data set is thereby significantly smoothed while preserving edges, in order to improve the determination of the geometric center.

In the exemplary embodiment, the planes E1 through E20 are rotated relative to one another, respectively by an angle Δα=9°, and the first straight line proceeds parallel to the x-axis of the DICOM coordinate system already defined for the volume data set. If, for example, the three-dimensional image 21 has a quarter of the overall size of the isotropic volume data set in the exemplary embodiment, the maximum point distance at the surface of the three-dimensional image 21 thus corresponds to approximately 20 pixels.

Figure 3:
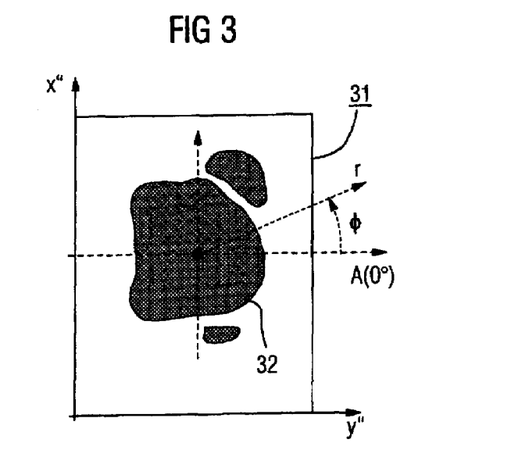
FIG. 3 shows, in Cartesian coordinates, image information of one of the planes shown in FIG. 2.

In each of the planes E1 through E20, slices of the three-dimensional image 21 are imaged. Such a section 31, which in the exemplary embodiment is defined by the plane E1, is schematically shown in FIG. 3. Moreover, the image contents of the individual planes $E_1$ through $E_{20}$ are described in Cartesian coordinates. The image contents of the plane $E_1$ are described with the Cartesian coordinates x" and y" in the exemplary embodiment.

In order to obtain the surface contour of the three-dimensional image 21, the slices shown in the planes $E_1$ through $E_{20}$, thus also the slice 31 of the plane $E_1$, are subsequently analyzed, in that the contours of the individual slices are determined. The contour of the slice 31 is provided with the reference character 32 in FIG. 3.

Figure 4:
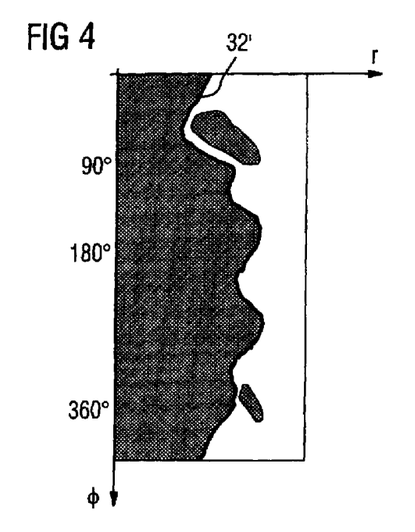
FIG. 4 shows, in polar coordinates, image information of the plane shown in FIG. 3.

For an efficient determination of the contours, in the exemplary embodiment the image information of each plane $E_1$ through $E_{20}$ is radially newly arranged, by transformation to polar coordinates (r, Φ) with regard to the geometric center S. The result of such a coordinate transformation is shown as an example in FIG. 4, for the transformation of the image contents in particular of the slice 31 of the plane E1 shown in FIG. 3. The transformed contour of the slice 31 is provided with the reference character 32' in FIG. 4.

Figure 5:
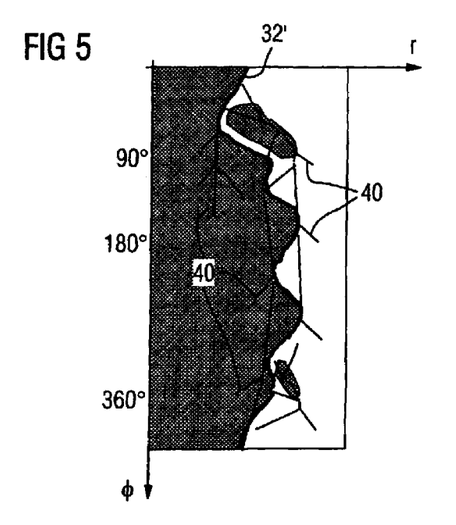
FIG. 5 is an illustration of a determination of a contour shown in FIG. 4.

The transformed contour 32' is subsequently determined. A delimiting path (contour path) is thus sought that corresponds to the contour 32' transformed into polar coordinates. For this, a directionally biased filtering first ensues that can even be one-dimensional in the r-direction, and that can operate so as to both be sensitive to enhance edges and to suppress noise. A one-dimensional search for the delimiting path, thus for the transformed contour 32', now is undertaken using the principle of dynamic optimization, as, for example, specified in R. Bellman, "Dynamic programming and stochastic control processes", Information and Control, 1(3), pages 228-239, September 1958. Thus the r-coordinates corresponding to the angular coordinates Φ between 0° and 360° are sought, with the boundary condition that the r-coordinate for Φ=0° should be equal to the r-coordinate for Φ=360°. In the exemplary embodiment, these r-coordinates are determined by, after a relatively significant smoothing, superimposing the first and last five lines, and subsequently the edge positions are determined in the smoothed line data. This search is shown as an example in FIG. 5, wherein the transformed contour is again provided with the reference character 32'. The lines 40 in FIG. 5 are shown thinner than the transformed contour 32' and represent path alternatives found during the determination that, however, were finally discarded.

The contours (transformed into polar coordinates) of the remaining planes $E_2$ through $E_{20}$ are similarly determined and subsequently considered in context. This involves examining whether the continuity of the brightness or of the gradients relevant in this direction is plausible.

The found contours (transformed into polar coordinates) of each plane $E_1$ through $E_{20}$ are subsequently transformed back to Cartesian coordinates, and after this are merged into a surface grid. The surface grid thereby corresponds to the surface contour of the three-dimensional image 21.

In the exemplary embodiment, the surface grid is now improved and refined in the original three-dimensional Cartesian coordinates. Using the surface grid, the surface contour of the three-dimensional image 21 to be determined is interpolated down to the voxel resolution. The voxels within the surface grid are subsequently marked as pertaining to the three-dimensional image 21.

The volume data set is represented as a three-dimensional data block B'(r, Φ, α) by means of the placement of the planes $E_1$ through $E_{20}$ through the three-dimensional image 21 and via the subsequent coordinate transformation to polar coordinates. The determination of the transformed contours (such as, for example, the transformed contour 31') is less calculation-intensive for approximately convex subjects. A contiguous "mountain surface" is sought via Φ and α. The "mountain surface" locally exhibits only relatively small variations in the r-direction.

The number of voxels analyzed for the determination of the contours is also reduced with regard to a three-dimensional surface contouring according to the prior art. If the volume data set contains, for example, 50 CT slices with an approximate dimension of 128 pixels of the three-dimensional image whose surface contour should be determined (thus a processing field approximately 50×256×256 large), approximately a million voxels (20 planes, polar coordinate raster 2°, $r_{max}$=256) are analyzed. According to the prior art, in contrast to this approximately 3 million voxels are analyzed.

In order to obtain the improved surface grid in the exemplary embodiment, in addition to the planes $E_1$ through $E_{20}$ of the first set of planes, alternatively at least one further, second set of planes (not shown in the Figures for reasons of clarity) can be placed. The planes of the second set of planes intersect in a second straight line that likewise proceeds through the geometric center S and is aligned at a right angle to the first straight line G. The slices shown with these planes are again transformed into to polar coordinates with regard to the geometric center S. The transformed contours that are associated with the surface contour of the three-dimensional image 21 are subsequently determined again, analogously as above. The determined transformed contours are subsequently again transformed back, and thereafter are combined into the surface grid.

It is also an advantage that, via the coordinate transformation into polar coordinates, the determination of the transformed contours in the rotation direction α (azimuthal) and in directions within the planes (Φ, orbital) can substantially be three-dimensionally implemented as a two-dimensional filtering, namely as a smoothing of r(Φ,α), instead of in the original coordinates.

The volume data set with which the three-dimensional image 21 is produced is, in the exemplary embodiment, produced with a computed tomography apparatus. The volume data set alternatively can be produced with other medical technology devices, such as in particular with an x-ray device, a magnetic resonance device, by PET, an ultrasound device, or by means of nuclear medicine. Imaging devices or technical devices outside of medical technology also can be used.

The three-dimensional image 21 is an image of a part of the patient 3, however, the surface of a non-human three-dimensional object image also can be contoured by means of the inventive method.

The first straight line G need not necessarily proceed through the geometric center S of the three-dimensional image 21. The planes $E_1$ through $E_{20}$ also need not necessarily intersect in the straight line G.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for surface contouring of a three-dimensional image of an object comprising the steps of:

placing a set of planes through the three-dimensional image, the planes of the set of planes intersecting in a straight line and being at respectively different rotational angles around said straight line;

determining contours that are imaged in each of the planes of the set of planes and that are associated with a surface contour of the three-dimensional image;

combining the contours determined in each plane of the first set of planes into a surface grid associated with the surface contour of the three-dimensional image; and displaying said three-dimensional image with said surface contour.

2. A method as claimed in claim 1 wherein the straight line proceeds substantially through the geometric center of the three-dimensional image.

3. A method as claimed in claim 2 wherein said three-dimensional image is formed by a volume data set and comprising filtering said volume dataset to determine the geometric center of the three-dimensional image.

4. A method as claimed in claim 2 comprising automatically determining the geometric center of the three-dimensional image.

5. A method as claimed in claim 2 comprising specifying the image contents of each plane of the set of planes in Cartesian coordinates and, for each plane, determining the contours in that plane by:

applying a coordinate transformation to polar coordinates approximately with regard to the geometric center of the three-dimensional image, and thereby unwinding the contour; and determining the contour in the transformed plane.

6. A method as claimed in claim 5 comprising determining the contour in the transformed plane, by continuation criteria in the direction of the angular coordinate of the polar coordinator with an optimization for minimizing accumulated point-to-point changes.

7. A method as claimed in claim 5 comprising improving the contour in the transformed plane by dynamic optimization.

8. A method as claimed in claim 1 wherein the set of planes is a first set of planes and wherein said straight line is a first straight line, and comprising:

placing a second set of planes through the three-dimensional image with the planes of the second set of planes intersecting in a second straight line;

orienting said second straight line perpendicularly to said first straight line;

determining the contours that are imaged in each of the planes of the second set of planes and that are associated with the surface contour of the three-dimensional image; and together with the contours determined in each plane of the first set of planes, combining the contours determined in each plane of the second set of planes into the surface grid associated with the surface contour of the three-dimensional image.

9. A method as claimed in claim 8 wherein the first straight line and the second straight line intersect in the geometric center of the three-dimensional image.

10. A method as claimed in claim 1 comprising acquiring the three-dimensional image with a medical imaging device, as representation of a part of a living organism of said subject.

11. A method as claimed in claim 10 comprising determining the geometric center of the three-dimensional image during a navigation-guided treatement of the living organism.

* * * * *